US009894852B2

(12) United States Patent
Gilbert et al.

(10) Patent No.: US 9,894,852 B2
(45) Date of Patent: Feb. 20, 2018

(54) MONITORING AND CONTROL SYSTEMS FOR THE AGRICULTURAL INDUSTRY

(71) Applicant: SemiosBIO Technologies Inc., Vancouver (CA)

(72) Inventors: Michael Gilbert, Vancouver (CA); Leonard Metcalfe, Surrey (CA)

(73) Assignee: SemiosBIO Technologies Inc., Vancouver, British Columbia (CA)

( * ) Notice: Subject to any disclaimer, the term of this patent is extended or adjusted under 35 U.S.C. 154(b) by 364 days.

(21) Appl. No.: 14/759,715

(22) PCT Filed: Jan. 7, 2014

(86) PCT No.: PCT/CA2014/000008
§ 371 (c)(1),
(2) Date: Jul. 8, 2015

(87) PCT Pub. No.: WO2014/107797
PCT Pub. Date: Jul. 17, 2014

(65) Prior Publication Data
US 2015/0351336 A1    Dec. 10, 2015

Related U.S. Application Data

(60) Provisional application No. 61/750,265, filed on Jan. 8, 2013.

(51) Int. Cl.
*A01G 25/16* (2006.01)
*H04L 29/08* (2006.01)
(Continued)

(52) U.S. Cl.
CPC ............ *A01G 25/16* (2013.01); *A01B 79/005* (2013.01); *A01G 1/001* (2013.01); *A01M 1/026* (2013.01);
(Continued)

(58) Field of Classification Search
CPC ........ A01B 79/005; A01G 1/00; A01G 1/001; A01G 25/16; A01M 1/02; A01M 1/026;
(Continued)

(56) References Cited

U.S. PATENT DOCUMENTS 5,927,603 A * 7/1999 McNabb .............. A01G 25/092
239/63
6,385,544 B1   5/2002 Mafra-Neto
(Continued)

FOREIGN PATENT DOCUMENTS

WO    2004/110142    12/2004
WO    2009/118436    10/2009
(Continued)

OTHER PUBLICATIONS

M. Mafuta et al, "Successful Deployment of a Wireless Sensor Network for Precision Agriculture in Malawi," in Network Embedded Systems for Every Application (NESEA), 2012 IEEE 3rd International Conference on, 2012 © IEEE. doi: 10.1109/NESEA.2012.6474009.*
(Continued)

*Primary Examiner* — Charles C Jiang
*Assistant Examiner* — Rose Clark
(74) *Attorney, Agent, or Firm* — Sunstein Kann Murphy & Timbers LLP (57) ABSTRACT

A mesh-based wireless network 10 of sensor/actuator devices I, D, T for an agricultural production area involves battery-powered sensors and actuators deployed under or within the foliage for broadcast communication with at least one repeater R according to broadcast time slots. The repeaters R are mounted above the vegetation canopy so as to be powered by solar panels. The repeaters R form a mesh network for routing data and commands to and from the sensors and actuators and at least one gateway GW. The
(Continued)

R: Repeater
T: Pheromone Tracking Module
I: Insect Detection Module
D: Pheromone Dispersal Module gateway communicates over a cellular network with a remote agricultural management server 14 and database 16.

6 Claims, 8 Drawing Sheets

(51) Int. Cl.

| | | |
|---|---|---|
| *H04W 72/00* | (2009.01) | |
| *H04W 72/04* | (2009.01) | |
| *H04B 7/155* | (2006.01) | |
| *A01G 1/00* | (2006.01) | |
| *A01B 79/00* | (2006.01) | |
| *A01M 1/02* | (2006.01) | |
| *A01M 1/14* | (2006.01) | |
| *H04W 84/18* | (2009.01) | |

(52) U.S. Cl.
CPC .............. *A01M 1/14* (2013.01); *A01M 1/145* (2013.01); *H04B 7/15542* (2013.01); *H04L 67/125* (2013.01); *H04W 72/005* (2013.01); *H04W 72/0446* (2013.01); *H04W 84/18* (2013.01)

(58) Field of Classification Search
CPC .......... A01M 1/14; A01M 1/145; H02J 3/383; H02J 7/008; H02J 7/35; H04B 7/155; H04B 7/15542; H04L 2012/2841; H04L 43/065; H04L 45/16; H04L 67/025; H04L 67/12; H04L 67/125; H04L 67/26; H04Q 2209/25; H04Q 9/00; H04W 28/021; H04W 28/0215; H04W 4/005; H04W 52/0219; H04W 64/003; H04W 72/005; H04W 72/0446; H04W 76/025; H04W 76/045; H04W 84/02; H04W 84/12; H04W 84/18; H04W 88/08; H04W 88/16; Y02B 70/346; Y02B 90/242
See application file for complete search history.

(56) References Cited

U.S. PATENT DOCUMENTS

| | | | |
|---|---|---|---|
| 6,724,312 | B1 | 4/2004 | Barber et al. |
| 6,766,251 | B2 | 7/2004 | Mafra-Neto et al. |
| 6,937,156 | B2 | 8/2005 | Gardner, Jr. et al. |
| 7,212,112 | B2 | 5/2007 | Barber et al. |
| 7,212,129 | B2 | 5/2007 | Barber et al. |
| 7,262,702 | B2 | 8/2007 | Barber et al. |
| 7,317,399 | B2 | 1/2008 | Chyun |
| 7,321,316 | B2 | 1/2008 | Hancock et al. |
| 7,348,890 | B2 | 3/2008 | Barber et al. |
| 7,496,228 | B2 | 2/2009 | Landwehr |
| 7,509,770 | B2 | 3/2009 | Gardner, Jr. et al. |
| 7,719,429 | B2 | 5/2010 | Barber et al. |
| 7,916,951 | B2 | 3/2011 | Landwehr et al. |
| 8,026,822 | B2 | 9/2011 | Borth et al. |
| 8,078,711 | B2 | 12/2011 | Jiang et al. |
| 8,139,858 | B1 | 3/2012 | Landwehr |
| 2002/0016676 | A1 | 2/2002 | Sann |
| 2002/0107639 | A1 | 8/2002 | Mafra-Neto |
| 2006/0150470 | A1 | 7/2006 | Ronnau |
| 2007/0185660 | A1 | 8/2007 | Anderson |
| 2008/0157990 | A1 | 7/2008 | Belzer et al. |
| 2008/0184614 | A1 | 8/2008 | Higbee et al. |
| 2008/0204253 | A1 | 8/2008 | Cottee et al. |
| 2009/0022121 | A1* | 1/2009 | Budampati ........... H04L 1/1887 370/338 |
| 2010/0029268 | A1* | 2/2010 | Myer ........................ F21S 2/00 455/426.1 |
| 2010/0029317 | A1* | 2/2010 | Budampati ........... H04W 52/08 455/522 |
| 2011/0035059 | A1* | 2/2011 | Ersavas .................... A01G 1/00 700/276 |
| 2011/0241889 | A1* | 10/2011 | Fromme ............. G01N 1/2226 340/632 |
| 2012/0046790 | A1 | 2/2012 | Anderson |

FOREIGN PATENT DOCUMENTS

| | | |
|---|---|---|
| WO | 2011/090938 | 7/2011 |
| WO | 2012/054397 | 4/2012 |

OTHER PUBLICATIONS

P. Tirelli et al, "Automatic Monitoring of Pest Insects Traps by Zigbee-based Wireless Networking of Image Sensors," in Instrumentation and Measurement Technology Conference (I2MTC), 2011 © IEEE. doi: 10.1109/IMTC.2011.5944204.*

Smart Agriculture project in Galicia to monitor vineyards with Waspmote by Alberto Bielsa, dated Jun. 8, 2012 www.libelium.com/smart_agriculture_vineyard_sensors_waspmote.

Agra-Sense, Precision Agriculture Using Sensor-Based Wireless Mesh Networks Siuli Roy, A. D., and Supriyo Bandyopadhyay. "Agro-sense: Precision agriculture using sensor-based wireless mesh networks." Innovations in NGN: Future Network and Services, 2008. K-INGN 2008. First ITU-T Kaleidoscope Academic Conference. IEEE, 2008.

Canadian Intellectual Property Office, International Search Report dated Mar. 17, 2014, PCT/CA2014/000008, together with the Written Opinion of the International Searching Authority, 8 pages.

\* cited by examiner

MONITORING AND CONTROL SYSTEMS FOR THE AGRICULTURAL INDUSTRY

FIELD OF THE INVENTION

This invention relates to precision agriculture and to the application of apparatus and networking approaches to support precision agriculture. In another aspect the invention relates to monitoring and control systems for agricultural production areas. In particular this invention relates to a wireless network of sensors and actuators, and a remote server and database for data analysis, dissemination of information distribution and integrated control of the actuators.

BACKGROUND OF THE INVENTION

Precision agriculture involves observing and responding to localized field conditions on a farm, vineyard or orchard using technologies such as aerial and satellite imagery, sensor arrays and geographic information systems, so as to optimize field-level management. The process involves matching the topology of a production area with the geo-location of data, such as climactic conditions, soil conditions, weeds and diseases, across the area to be managed.

The recording of localized data and its delivery to a database in so-called precision agriculture may be by means of a wireless sensor network. In practice, the successful implementation of sensor networks over the relatively large areas covered by a farm, vineyard or orchard has faced challenges and obstacles.

A network of sensors distributed throughout an agricultural production area must have access to sufficient power to operate over long periods with little and preferably no maintenance.

It has been contemplated to use wireless sensor mesh networks for data collection, for example using the ZigBee or other protocols.

In order to conserve energy and extend their standalone working life, sensors in wireless sensor mesh networks are sometimes operated using sleep and awake modes, awakening during specified time intervals to transmit data. The awake time must be long enough for the sensor to receive and forward any data that may be received from other sensors in the mesh network. This results in the relatively large number of sensor nodes in the network being awake and transmitting or retransmitting at substantially the same time. The inventors have found that this results in interference and collisions that must be managed and that degrade the performance of the network. An alternative that has been attempted by the inventors is to enlarge the time slots for mesh network transmissions between the sensors. However, any enlargement of the awake time is at the direct (and almost inversely proportional) expense of battery life.

An additional challenge in the use of wireless sensor mesh networks in agricultural applications is that the optimal location of the sensors is often on the trunk of the plant or within its foliage in which case the vegetation itself acts as an obstruction to signal propagation. This threatens to orphan some nodes in the mesh network or to require more retransmissions and impose a greater network management burden, again drawing more power from the battery. More significantly, placing a sensor unit in or beneath the foliage severely restricts the available insolation for solar panels, particularly in more challenging climates.

The foregoing considerations combine to severely compromise the ability of the sensors to operate according to a mesh network protocol in agricultural applications where there are many sensor nodes or they are deployed within or under the foliage.

Libelium Comunicaciones Distribuidas S. L. discloses (on its web site at libelium.com/smart_agriculture_vineyard_sensors_waspmote) the general features of a network-based system for the monitoring of environmental parameters in an agricultural production area. The system includes a plurality of sensor nodes operating wirelessly in any of several network protocols including ZigBee. The sensor nodes have sleep modes and hibernate modes. When active, they communicate with gateway nodes which are mounted on poles and connect to a remote server over the Internet through 3G/GPRS.

U.S. Pat. No. 8,026,822 to Borth et al. discloses the use of a wireless sensor network in a pest control application. Pest control devices communicate wirelessly, through repeater nodes if necessary, to a gateway that makes data available to a remote data server for viewing, analysis or messaging.

WO 2011/090938 to Rhee et al. discloses the use of a wireless mesh network in a rodent pest control system. Each of various traps is paired with a wireless device, the wireless devices being in communication via a mesh network for reporting the capture of an animal. A repeater may be used in the mesh to extend the effective range of the network. Data is routed through the mesh network to a wireless gateway to an external network and hence to a management server.

Neither Borth et al. or Rhee et al. discuss the issues involved in applying the invention to an agricultural context.

U.S. Pat. No. 7,916,951 to Landwehr et al. discloses an insect monitoring device for use in an agricultural context. Landwehr et al. refer generally to networking multiple devices and relaying information to a processor but no detail is provided in relation to the network operation or in relation to any problems arising from operating sensor mesh networks within crop foliage.

A specific opportunity exists to apply wireless sensor networking in the field of insect management in agricultural applications. The current practice in agricultural areas involves setting up an array of insect traps distributed across a field, farm, vineyard or orchard, weekly attendance at each trap for manual or automation-assisted logging of insect activity, resetting or cleaning the traps, reviewing the collected data and the subsequent decision whether to disperse pesticides or bio-pesticides in the production area. While the agricultural industry is moving toward fully organic farming by reducing pesticide usage, such a reduction requires precision control of insect infestations, which is economically challenging in view of the labor-intensive approach to insect detection.

Organic farming also requires using bio-pesticides that rely on artificial insect pheromones to disrupt the insect mating cycle. The pheromones are continuously dispersed using timed aerosol sprayers or time release compounds which can last most of a growing season. The effectiveness of the pheromones is determined by placing traps to catch, count and identify targeted insects on a weekly basis. The trap counts are relied on to adjust the placement of pheromone sprayers or the compounds used. More frequent and real-time monitoring would allow a quicker and more effective response to any pest conditions that might be detected, while the application of precision agriculture concepts may allow the response to be more localized.

The application of wide scale characterization and analysis of insect populations would also enable the more targeted application of pheromone-based disruptors, and the use of more measured minimal quantities than are conventional used at present. Wind, altitude, humidity, vegetation and topological features can determine pheromone drift. A real-time localized insect count opens the possibility of inferring the propagation pattern of pheromones for more efficient dispersal.

The present invention is directed to a monitoring and control system for agricultural applications that addresses transmission and network management problems arising from crop foliage.

SUMMARY OF THE INVENTION

In one aspect, the invention comprises a wireless network of sensor/actuator devices within an agricultural production area. The devices are deployed within the crop, and under or within the foliage. Preferably each sensor/actuator device is positioned to communicate wirelessly with at least one of several repeaters mounted preferably above the foliage for line of sight communication with other repeaters. At least one gateway provides for communication to an external communication network.

Data collected from the devices is transmitted to a remote management server for data analysis, user access, messaging users and providing access by users. The server also issues commands for propagation through the network to the sensor/actuator devices.

In one embodiment the invention takes the form of a pest management system. The plurality of devices forming the wireless network comprises a plurality of first devices comprising an insect trap, an imager for imaging the trap, a processor and a wireless communications module for broadcasting images of the trap, and a plurality of second devices comprising a pheromone canister, an aerosol actuator and a wireless communication module. The pheromone may be released according to a schedule that is a function of the specific location of each pheromone dispensing device and pursuant to commands from the server. The data collected may be aggregated across multiple growers to provide a broad basis for data analysis and tracking of pest distribution and behavior and more effective management.

In a further optional embodiment, the network includes a plurality of pheromone tracking devices for determining the levels of pheromone present at particular locations across the production area and for determining pheromone plume distribution. In a particular embodiment, the pheromone dispensing devices may dispense the pheromone along with a tracer to enable tracking of the pheromone plume by detection of the tracer.

The foregoing is intended as a summary only and of only some of the aspects of the invention. It was not intended to define the limits or requirements of the invention despite identifying certain more detailed embodiments. Further aspects of the invention may be determined from the description and claims that follow.

BRIEF DESCRIPTION OF THE DRAWINGS

The invention will be described by reference to the detailed description of the preferred embodiment and to the drawings in which.

DETAILED DESCRIPTION OF THE PREFERRED EMBODIMENT

The preferred embodiment of the monitoring and control system of the invention will be described by reference to an insect management system.

Figure 1:
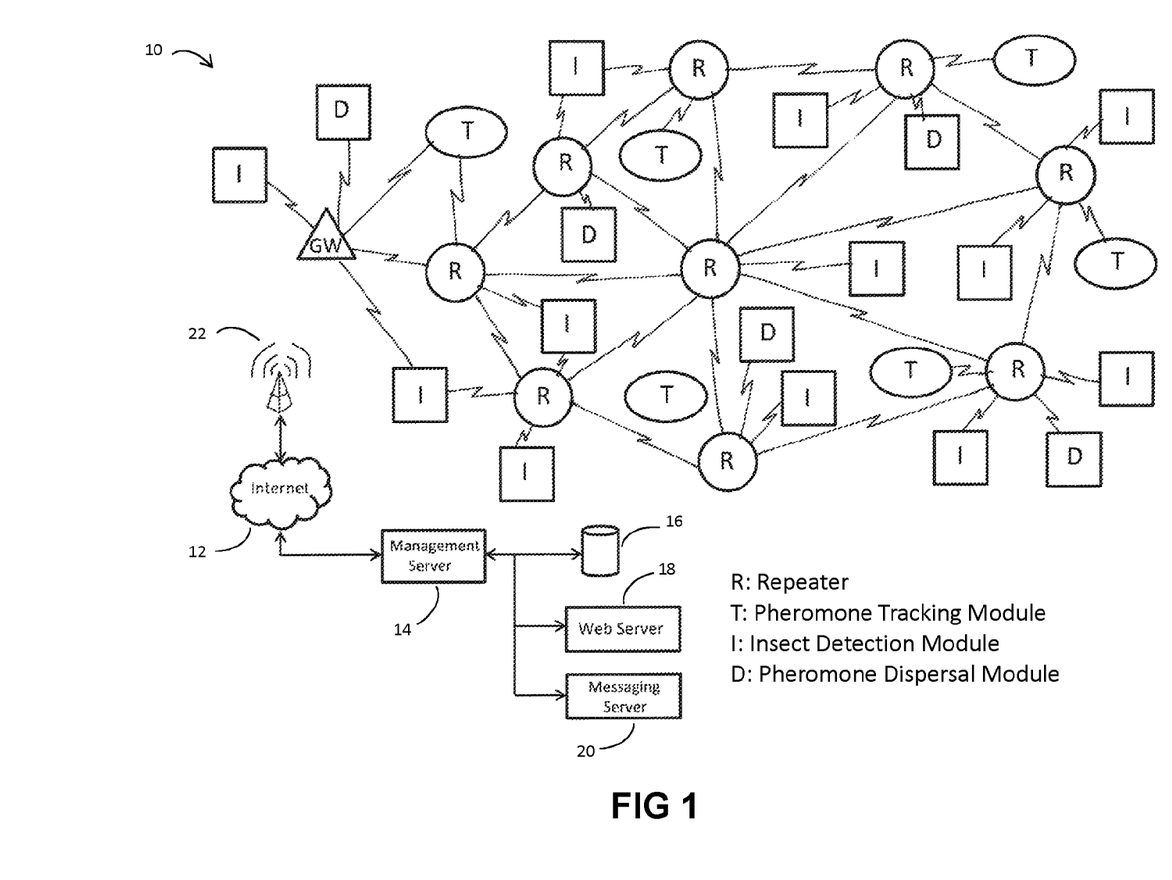
FIG. 1 is an overview of a preferred embodiment of an insect management system according to the invention.

FIG. 1 provides an overview of the system network 10 as deployed in relation to an agricultural production area. In the preferred illustrative embodiment, the production area is an orchard. The Internet represents what is now commonly referred to as the "cloud". It should also be appreciated that although the figure shows three types of sensor and actuation modules (namely pheromone tracking modules T, insect detection modules I and pheromone dispersal modules D), other types of sensor and actuator modules may actually be used in a similar network. In addition, the figure does not separately illustrate the weather modules that are mounted along with the repeaters in the preferred embodiment, as discussed in more detail below.

A plurality of insect detection modules I are arrayed throughout the orchard, including within and under the foliage. A plurality of pheromone dispersal modules D are also arrayed throughout the area and may similarly be disposed within or under the foliage. The insect detection modules I and the pheromone dispersal modules D are placed sufficiently close to at least one repeater R to be within reasonable broadcast transmission range having regard to any foliage that may obstruct line of sight to the repeaters R. In some cases, the modules I and D may be able to communicate with more than one repeater R. In the preferred embodiment, each repeater is intended to receive broadcasts from between 5 and 10 such modules that are arrayed within about 100 meters of the repeater. Each of the modules broadcasts data to at least one repeater within its broadcast range and receives transmissions from at least that repeater. An exception is when a module happens to be close enough to a gateway GW to be able to communicate directly with it. Several weather modules (described below) and pheromone tracker modules T may also be provided, also being configured to communicate with at least one repeater within their broadcast range.

A plurality of repeaters R are arrayed within the orchard, being mounted in an elevated position, preferably over the orchard canopy and in line of sight with at least one other repeater. The repeaters are configured to operate as a true mesh network to route and propagate data received from the insect detection modules I and the pheromone dispersal modules D among the other repeaters and ultimately to one or more gateway devices GW.

The gateway devices GW are also mounted in an elevated position above the canopy and provide a gateway for communicating through an external communication network 12 with a remote insect management server 14.

The server end of the system includes a management server 14, a database and a database server 16, a data analysis application and user interface facilities including a web server 18 and a messaging server 20.

The insect detection module D is a preferred illustrative embodiment of a sensor device and is used for detecting the presence of insects in a trap. Collectively the plurality of detection modules I determine localized insect counts at various points across the orchard. The insect detection modules D are mounted or hung in or among the trees at a plurality of locations selected to provide a representative evaluation of the incidence of insects in the orchard. As will be discussed below the insect detection module I of the illustrative embodiment comprises a camera trap for imaging trapped insects and broadcasting the image data into the network. It will be appreciated that in agricultural applications other than insect management, the sensor devices may involve sensing a variety of other features, for example environmental conditions, irrigation parameters, crop growth or disease.

The pheromone dispersal module D is the preferred illustrative embodiment of an actuator device. According to this embodiment the sensor devices and the actuator devices are separate devices. The pheromone dispersal devices D cause the controlled release of pheromones to repel, attract or disrupt the mating of insects. In applications other than insect management, actuator devices may comprise actuators for irrigation, the dispensing of fertilizer, harvesting or any other controllable activity.

Because of their placement in or under the foliage, there may be insufficient insolation to properly supply solar power to the insect detection modules, the pheromone dispersal modules, the weather modules and the pheromone tracker modules. As a result, such devices rely primarily on battery power. In order to conserve battery power, those modules each have a sleep mode according to which each module's radio is awake for communication about 100-400 ms per 10 minute interval. Other suitable intervals can also be used. This allows the modules to operate for up to a year before it is necessary to attend at the modules to change the batteries. However, such a short interval of awake time is insufficient to allow the modules to operate as routing nodes in a mesh network and accordingly the invention contemplates them broadcasting directly to a repeater R.

During the awake interval, the modules communicate through the network of repeaters R and gateways GW to synchronize their clocks and to deliver sensor data through the network. Each module's awake time is staggered in relation to that of the other modules to minimize signal and data conflicts at the repeaters and at gateways. The communication time slots are assigned by the gateway GW. The repeaters R also communicate with the gateways GW according to time slots assigned to the repeaters by the gateway. Alternatively, the repeater can communicate with the gateways immediately upon receipt of data from sensor or actuator modules, and may use assigned repeater time slots when conveying a repeater's own data, such as power levels, temperatures, error codes, signal strengths and network configuration parameters. In the preferred embodiment, similar data is supplied by the sensor and actuator modules during their own assigned communication time slots. Gateways convey their own similar data to the server 14.

The elevated position of the repeaters R above the tree canopy allows the repeaters to be powered substantially by solar power by means of solar panels associated with each repeater. This in turn allows the repeaters to operate on a substantially continuous basis without a sleep mode. The repeaters may therefore be configured to operate as routers such that the collection of repeaters form a true mesh network to propagate data between the sensing/actuating devices and a gateway device. As the repeaters operate with sufficient power on a continuing basis, delays and power consumption due to collisions are overcome by allowing the repeaters to continuously monitor for signal reception and to retransmit data through the mesh network.

At least one gateway device GW acts as a gateway node to an external communication network. In the current preferred embodiment, the gateway nodes communicate with a 3G or 4G network, requiring reasonable line of sight to a cell node. The gateway nodes may be located so as to maximize the signal strength between the gateway node and a cellular network tower 22 or another other external network access facility.

Each of the modules, repeaters and gateway in the network collect data regarding their own operation and the network for forwarding to the management server 14, including power levels, temperatures, error codes, signal strengths and network configuration parameters.

Insect Detection Modules

The insect detection module I according to the preferred embodiment is illustrated FIGS. 2, 3, 4, 5 and 6. In the preferred embodiment, the module comprises:

- an enclosure having a principal weather proof component housing 30 and walls 32, 34 extending from the housing to a grid supporting surface
- a grid 36 dispensed from a roll, and a sticky substance applied to its surface for trapping insects. The grid of the preferred embodiment exposes an area of 7"×5". An appropriate dose of pheromone lure is applied to the surface.
- a roll motor (not shown) for scrolling the grid from the roll
- a 640×480 pixel CMOS camera 38 with JPG compression and a serial output
- one or more LEDs 40
- an ambient light sensor 42
- an ambient temperature sensor 44
- a radio 46 for operating in an ISM band, preferably the 2.4 GHz band
- a GPS sensor 48
- a battery or cells 50
- a processor 52 including a clock
- memory 54
- a network interface controller 56
- an antenna 58
- a compressed air supply (not shown) with an actuator and an air nozzle directed to the camera lens to clean it
- a hook 60 or other attachment means for attaching the module I to the trunk or a branch of a plant or to another convenient structure.

Note that not all of the above components are necessarily illustrated in the drawings.

Figure 2:
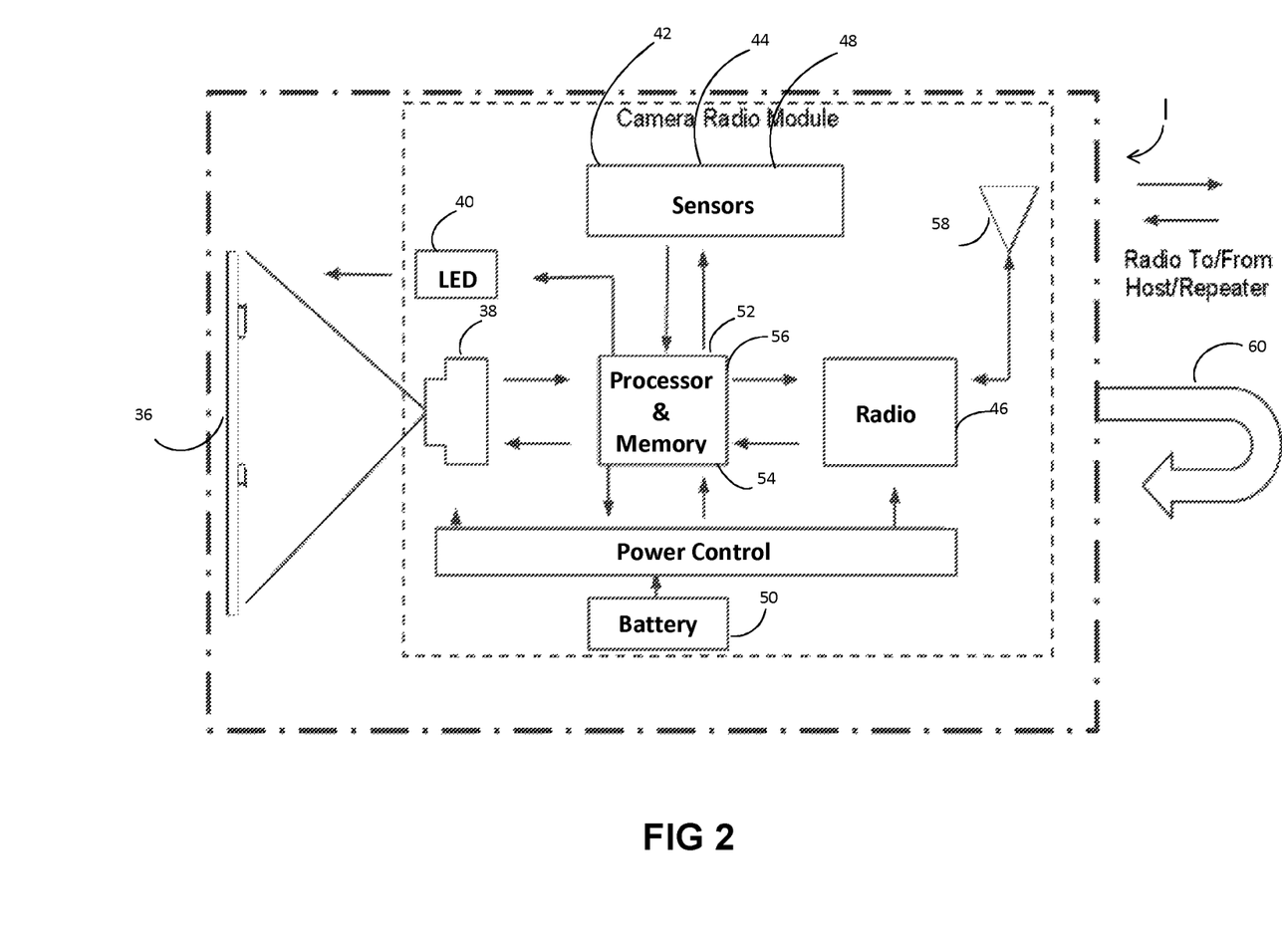
FIG. 2 is a block diagram of an insect detection module according to an embodiment.
Figure 3:
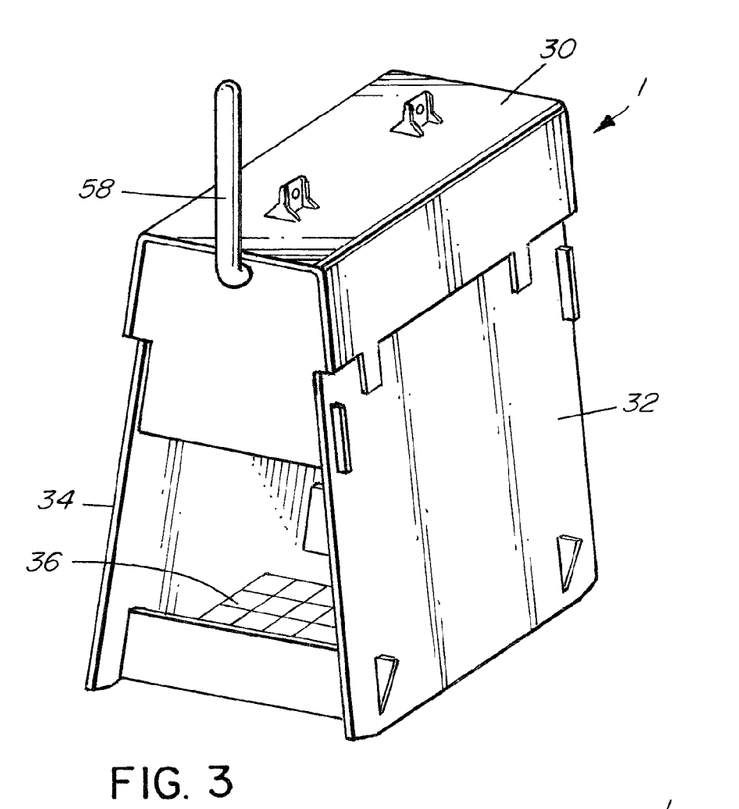
FIG. 3 is a perspective view of an insect detection module according to an embodiment.
Figure 4:
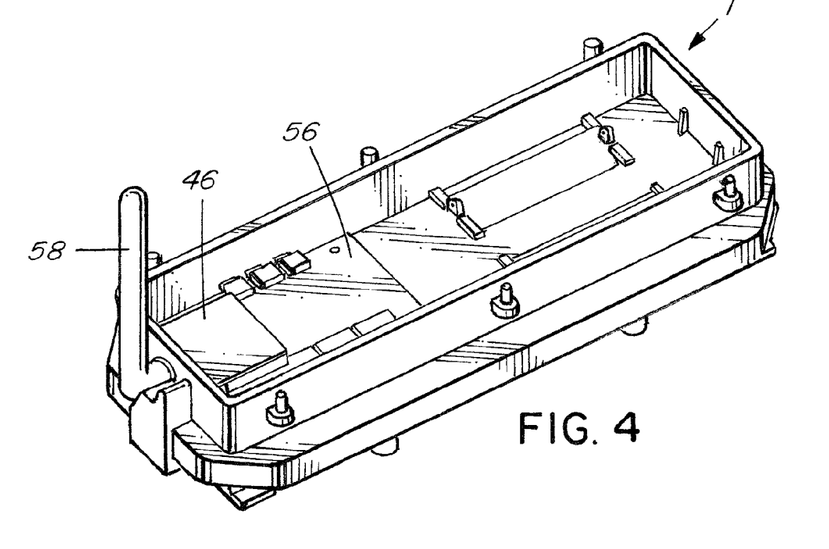
FIG. 4 is a top perspective view of the component housing of the insect detection module of FIG. 3.
Figure 5:
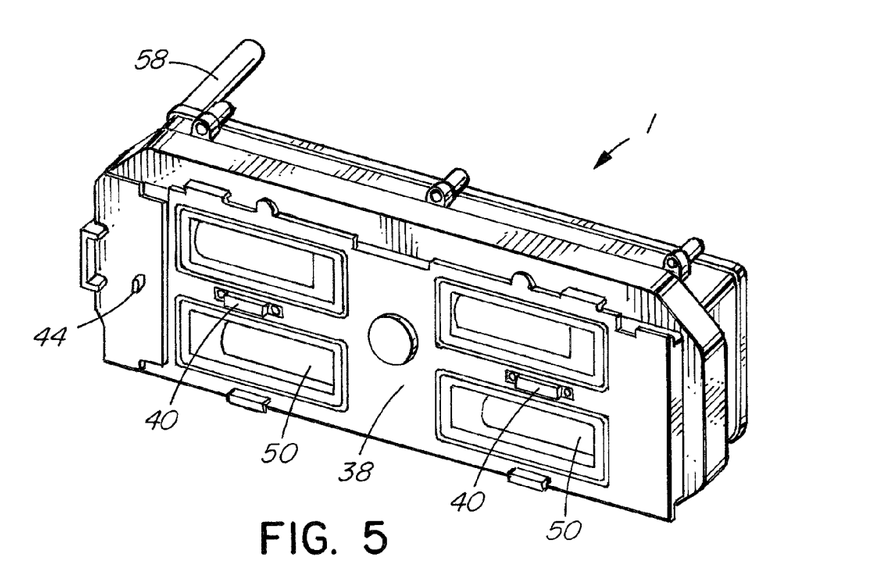
FIG. 5 is a bottom perspective view of the component housing of FIG. 4.

Upon field network configuration of the module, the GPS sensor 48 detects the coordinates of the device, allowing the processor 52 to cause the radio 46 to broadcast a unique ID associated with the module I along with the GPS coordinates and a request to be configured into the network 10. Once a repeater R within broadcast range detects the network configuration request, that module I is associated as a slave to the repeater in question. All future network communications are then routed through that repeater R. The pheromone dispersal modules D, the weather modules and the tracker modules T undergo the same field network configuration.

The processor 52 controls the operation of the camera 38, collects the camera output, assigns timing information and saves the image to memory. The processor 52 may also handle power management, configure data packets and control communications.

Figure 6:
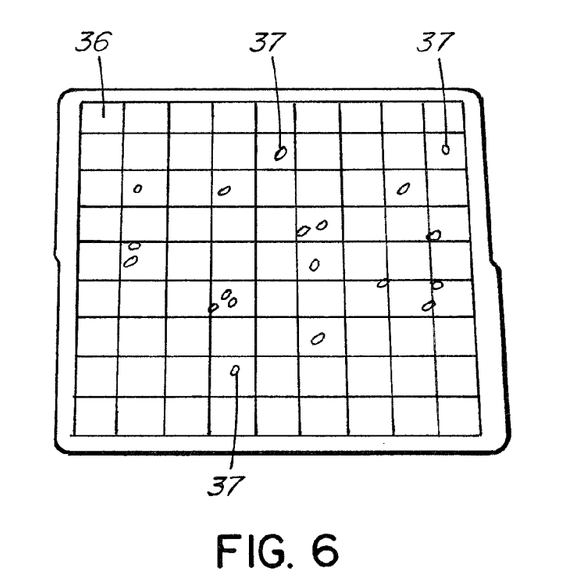
FIG. 6 is an exemplary view of a grid card with trapped insects used in the insect detection module according to an embodiment.

At predetermined intervals or according to a schedule, the camera 38 captures an image of the grid 36. The schedule may be preset or it may be communicated to the module $I_1$ by the server 14 during the communication sessions. In the event that there is insufficient ambient light to capture a satisfactory image, the processor 52 causes the LED(s) 40 to strobe so as to illuminate the grid 36 during the image capture. The LED 40 may provide various colors so as to more effectively image insects that are trapped on the grid 36 to support insect characterization and to attract certain insects (for example ultraviolet light). The timing of image capture may be based on the type of insect to be monitored. For example, many insects will be active before sunrise and a schedule may provide for a daily image capture, for example, an hour before sunrise.

The camera's JPG images are delivered to the processor 52 that configures data packets and causes the radio 46 to broadcast the packets through to the gateway GW. The images of the captured insects are propagated through the network and ultimately to the insect management server 14 where the images are assessed to determine newly captured insects in comparison to the insects that have previously been assessed from earlier images of the same grid.

The scroll motor is used to scroll the grid 36 to an unused portion of a grid roll in response to a command received from the remote insect management server 14. When the server 14 determines that the exposed grid 36 is no longer effective in capturing additional insects 37 or that the number of captured insects 37 renders insect characterization difficult, a command is dispatched to trigger scrolling of the grid. It will be appreciated that storage of the used portion of the grid that includes captured insects limits the number of times that the scrolling feature may be used. However every scroll effectively multiplies the period during which the camera trap need not be attended to manually.

The image processing for the purposes of insect characterization and insect counts is performed at the insect management server 14. Upon detecting a particular insect type, or upon reaching a threshold parameter relating to the incidence of insects, the message server 20 may deliver a message by text, email or any other means, to alert a designated user.

The insect management server 14 may also determine that the image appears to be affected by debris or dew on the camera lens. In such case, the server 14 may dispatch a command to the affected module to trigger an actuator for the air nozzle to clean the lens prior to capturing the next scheduled image.

Pheromone Dispersal Module

Figure 7:
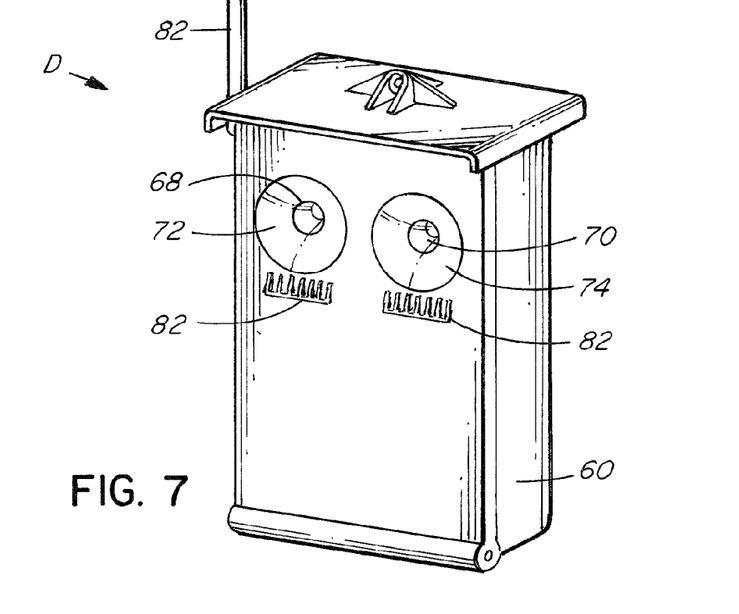
FIG. 7 is a front perspective view of a pheromone dispersal module according to an embodiment.
Figure 8:
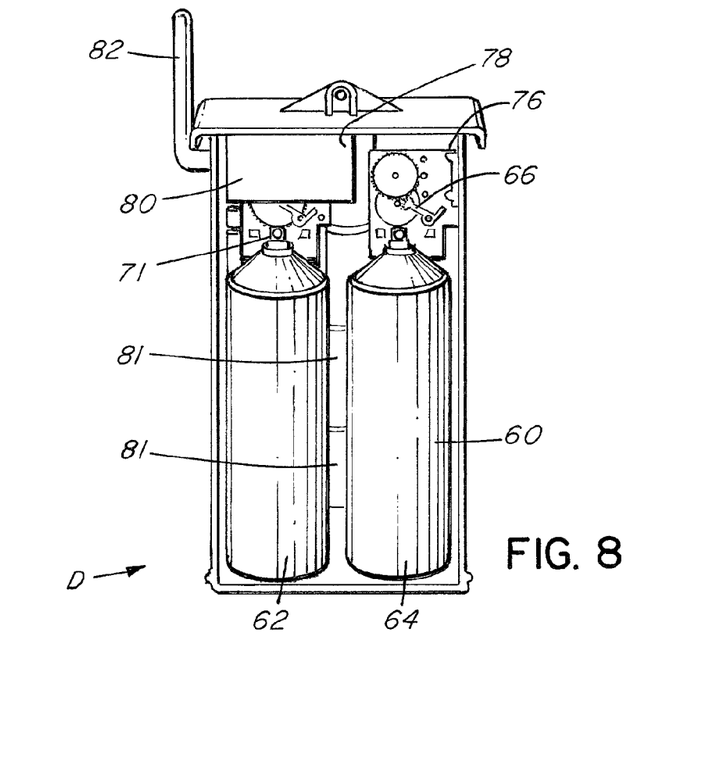
FIG. 8 is a front view of the pheromone dispersal module of FIG. 7 with the front wall of the module enclosure removed.

The pheromone dispersal module D according to the preferred embodiment is illustrated in FIGS. 7 and 8. The module controls the aerosol distribution of two types of pheromones for mating disruption of two different pest species while monitoring the ambient temperature for calculating micro-climate degree days. Typically these modules are placed in the upper third of the tree canopy at the beginning of the growing season and remain in place until after harvest time.

The housing 60 includes two 300 ml canisters 62, 64 of pheromone, which may include an integrally mixed tracer, aerosol motors 66 and nozzles 68, 70. A flow monitoring IR sensor 72, 74 is mounted on each nozzle to confirm that the nozzles have emitted a spray. The tracer is dispersed along with the pheromone such that tracking the distribution of the tracer enables the tracking of the distribution of the pheromone and hence the distribution and measurement of the plume or plumes throughout the production area.

The module comprises:
- a housing 60
- two 300 ml canisters of pheromone 62, 64
- a supply of tracer, which may be mixed with the pheromone
- an aerosol nozzle 68, 70 and actuator 71 associated with each canister and tracer supply
- an IR sensor 72, 74 mounted on each nozzle 68, 70
- an ambient air temperature sensor 76
- a network controller 78
- a processor
- a radio module 80
- a GPS sensor
- two IR LEDs
- a battery or cells 81
- an antenna 82
- excess material collectors 82

Note that not all of the above components are necessarily illustrated in the drawings.

Dispersal of the pheromone is according to commands received from the insect management server 14 during the awake period of the module D but the actual dispersal is according to a schedule supplied by the server 14 and downloaded to each module. The actual dispersal may be at a specific time other than during the awake times of the modules, particularly as there may need to be coordination of the timing of dispersal as between several pheromone dispersal modules.

Pheromone Tracker Module

The pheromone tracker module T tracks the pheromone plume. In the preferred embodiment, this is done indirectly by tracking the presence of a tracer that is dispersed with the pheromone and that exhibits similar dispersion properties. By detecting the levels of the tracer at various locations in the production area, the evolution of the plume may be determined.

The module (not separately illustrated) comprises a housing, a network interface controller, a chemical detection unit, an RF module, an antenna, a battery, memory and a processor. In the preferred embodiment, the tracer is ethanol and the chemical detection unit may be an MQ-3 ethanol sensor supplied by Hanwei Electronics Co., Ltd. The detection is controlled by powering the sensor to trigger a detection cycle and by depowering it when no detection is intended.

Weather Module

A weather module provides weather and environmental measurements and in the preferred embodiment is always mounted on the same pole as a repeater R or a gateway GW.

Figure 9:
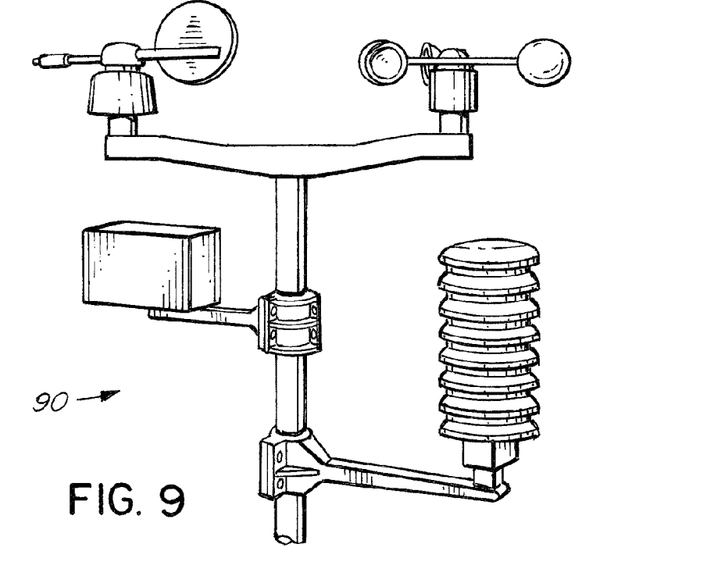
FIG. 9 is a front view of the sensor components of a weather module according to an embodiment.

An example of the sensor components 90 of a weather module is shown in FIG. 9. The illustrated system is a ProWeatherStation by Tycon Power Systems Inc.

The module comprises a housing, weather sensing devices 90, a network interface controller, a processor and an RF module. As the weather module is typically installed on the same pole as a repeater, it is configured to draw power from the solar panels of the repeater.

Repeater

Figure 10:
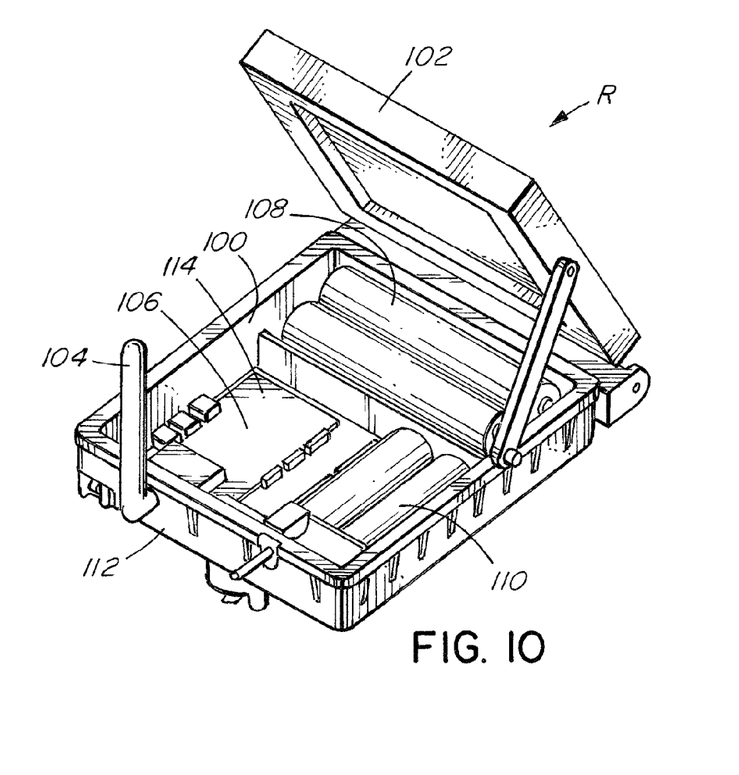
FIG. 10 is a top perspective view of a repeater module with the cover removed according to an embodiment.
Figure 11:
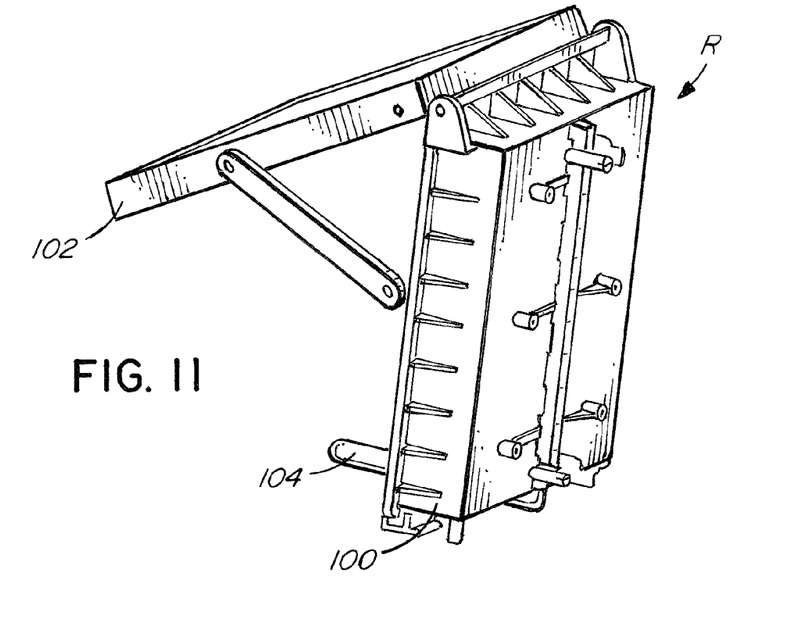
FIG. 11 is a perspective rear view of the repeater module of FIG. 9.

The repeater module R is illustrated in FIGS. 10 and 11. The module R comprises a housing 100, a solar panel 102, an antenna 104, a GPS sensor (not shown), an RF module 106, D-cell batteries 108, an LiFeO4 rechargeable battery 110, a temperature sensor 112 and a network interface controller 114 configured to operate in a mesh configuration with other repeaters to route received data toward a gateway. The module R is mounted on a pole that is sufficiently high that the solar panel is positioned above the vegetation canopy.

As discussed above, the repeaters R may operate substantially continuously to route incoming data or commands between the modules and the gateway GW. Not all of the components discussed above are necessarily represented in the drawings.

Universal Network Interface Controller

Figure 12:
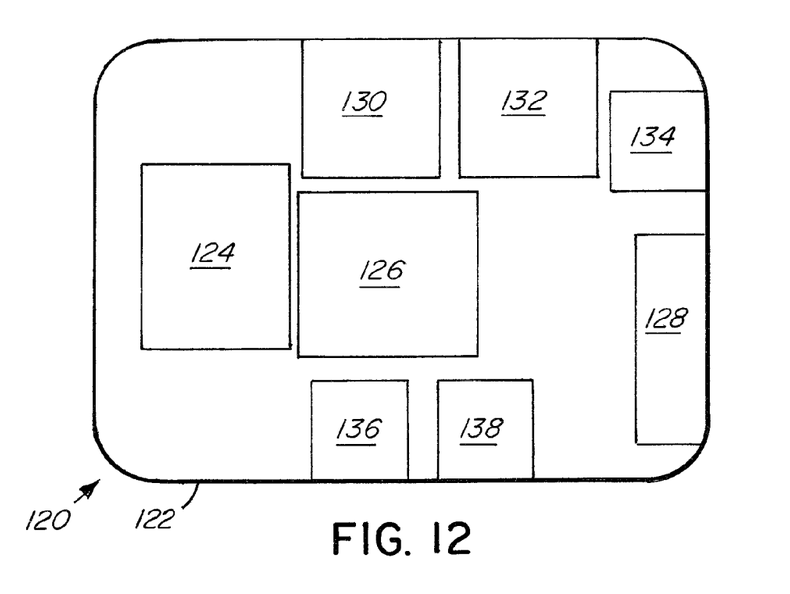
FIG. 12 is a diagram showing the functional modules of a universal network interface controller for use in the preferred embodiment.

A universal network interface controller 120, illustrated in modular form in FIG. 12, may be configured to facilitate the manufacture of sensor and actuator modules and repeaters for use in the network of the invention. The controller 120 comprises a card or a board 122 having a radio interface module 124, a processor and memory 126, a power supply 128 or power regulator, a temperature sensor 130, a GPS sensor 132 and I/O modules 134, 136, 138 for receiving and transmitting data and commands.

According to whether the universal interface controller 120 is used in a particular type of sensor or an actuator, various ones of the local I/O modules 134, 136, 138 may be used to interface with the data ports of a camera, chemical detection unit or other sensing device, or with a nozzle, valve or other actuating device.

Gateway

Figure 13:
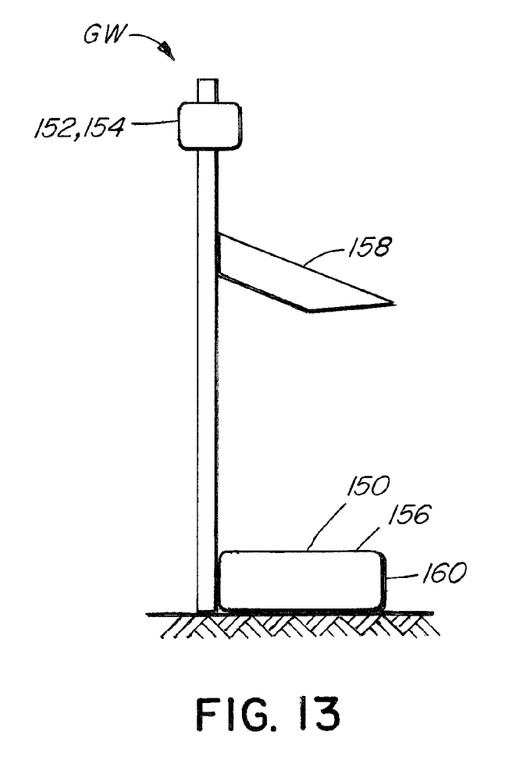
FIG. 13 is a diagram of a gateway according to the preferred embodiment.

The solar-powered gateway GW supplies the interface or gateway to the insect management server 14 and database 16 where all of the data and information regarding the agricultural production area is maintained. The gateway GW monitors and collects data from all repeaters R in the production area. In the preferred embodiment, communication between the gateway GW and the server 14 is via a 3G/4G cell phone modem. Once a connection is established with the server 14 through the cell phone network, the gateway GW pings the server 14 at regular intervals to validate its operation to the server.

The gateway GW is mounted on a pole above the vegetation canopy at a location designed to secure communication with a nearby cell phone tower 22. Being mounted above the vegetation canopy allows the gateway to operate on solar power in most locations.

The gateway comprises:
a housing 150
an RF module
a 2.4 GHz antenna 152
a 3G/4G antenna 154
a GPS sensor 156
a network interface controller
a cell phone modem
a solar panel 158
an LiFeO4 rechargeable battery 160

During the configuration of the network, the gateway GW receives a list of application nodes intended to be in its network from the insect management server 14, listens for pings from various modules (via the repeaters R) requesting to be part of the network, calculates the communication time offset for each module to determine the time slot assigned to that module and sends an acknowledgement comprising of time stamp with time offset to application nodes in list.

In normal operation the gateway GW listens for status updates from assigned modules (again via the repeaters R), listens for images from the modules, listens for weather updates from the modules and forwards the status update information to the server 14 via the cell phone network. The gateway buffers images received from various insect detection modules and transmits the buffered images as a package at regular intervals.

The gateway also downloads a list of events and files from the database 16, including schedules for the modules and firmware updates for transmission to the network of modules.

Geo-location

The preferred embodiment uses GPS sensors in each sensor module, actuator module, repeater and gateway. This allows the network to efficiently configure itself and supports the data analysis and graphical display of the network. It is recognized however that for cost reasons it may not be possible to include a GPS sensor in each unit. An alternative is to apply a visible code, for example a QR code, on each unit. During deployment in the field, a mobile device is used to image the QR code and to relay to a gateway or the server the coordinates of the mobile device when the QR code was scanned. Other means of determining the location of the various units of the system can also be used.

Insect Management Server

The management server 14 is remote from the actual production area. The server collects and logs the images and other data from the various modules, repeaters and gateways. Notably, the server collects grid image data from the various insect detection modules, processes the images to characterize insects trapped on the grid, then compares the results to the findings from the previously taken image. This enables the server to determine how many new insects of interest have been trapped in the period of time since the taking of the previous image from a given insect detection module. Where a certain user or predetermined threshold of new insects, of types of insects or of infestation parameters has been reached, the system may be configured to generate an alert to a particular user by text message, email or other messaging system.

The server includes a web server 18 and a user interface that enable users to access the data offered by the server and the database.

The server integrates the coordinates of the various modules with a map of the production area so as to graphically illustrate the locations of the various modules and nodes on the property. When a user clicks on a module on the map, the history of the images and other data collected from that module become available for review. The displayed data may include historical, current or relative (to other modules) insect counts at each module.

The data processing application may also derive infestation tracking based on trap information collected over a period of time, or in a particular image capture session across multiple insect detection devices, and provide a graphical display overlaid on the production area to allow visualization of either a snapshot insect infestation by degree of infestation or types of infestation, or a display illustrative of the progression over time of an infestation. The display may also include environmental data collected from the various sensors in the system modules.

The data processing application also assesses the information from the tracker modules T and offers a graphical display of the pheromone distribution or plume throughout the production area enabling the adjustment of pheromone dispersal activity from dispersal module D to dispersal module D for maximum efficiency and effect over the entire area of interest.

The data processing application can further consider data and mapping information from a plurality of growers, whether adjacent or not, to provide a broader basis for the analysis of insect infestation and its prevention.

A database 16 is associated with the server 14. It is used to store data including:
 configuration data (properties of devices and systems)
 logged image and other data
 property information (coordinates, divisions, packing house location, topology)
 product information
 product use information
 schedules for sensing and actuation In the foregoing specification, the invention has been described with reference to the specific embodiment of an insect management system. However, the scope of the invention should not be limited by the preferred embodiments set forth in the examples, but should be given the broadest interpretation consistent with the description as a whole. The invention is applicable to other aspects of precision agricultural management than insect management. Those may include assessing and controlling physical parameters such as irrigation, the dispensing and effect of fertilizers, crop growth, soil samples, well tests, tank mixtures, barn storage temperatures, pressures, filters, air flow and other parameters and controllable activities.

Other variations from the preferred embodiment are also contemplated.

For example, a dose of the pheromone lure may be re-applied to the sticky grid by means of an aerosol directed toward the grid. Similarly, rather than providing a roll of sticky grid that is scrolled onto the imaging surface, the roll may be a non-sticky grid that is scrolled unto the surface, and which is then made sticky by means of an aerosol spray of a suitable substance that is or becomes sticky on the surface of the grid.

While the sensor and actuator modules of the preferred embodiment are battery-powered, such power may be supplement or even replaced in some case by solar, wind or other energy sources.

It is also contemplated that the collection of data from the insect detection modules may be done manually by examining the grid images rather than by image processing applications.

The pheromone dispersal module has been described as comprising dual pheromone canisters and dispensing nozzles. However this is non-limiting and a single canister or more than two could be used. In addition, more than one pheromone may be provided in a single canister.

While the gateway of the preferred embodiment uses solar power, it could be placed adjacent a wired power source, such as at a farmhouse or another building in the production area. Similarly, the gateway may be placed in a location that allows a wired or a wireless LAN connection to the Internet rather than through a cellular facility.

The set-up of the network of sensors, actuators, repeaters and nodes may be accomplished by the grower or installer placing the units according to a map of the agricultural production area on which the locations of the units are marked and referenced by GPS coordinates. Such a map may be supplied by the system's management server.

The specification and drawings are, accordingly, to be regarded in an illustrative rather than a restrictive sense.

The invention claimed is:

1. A wireless mesh network for an area having a present or anticipated vegetation canopy, said network comprising:
 a plurality of battery-powered sensor or actuation modules arrayed at spaced locations within said area;
 said modules being installed under said vegetation canopy;
 said modules being configured for broadcast communication with at least one of a plurality of repeaters deployed at spaced locations within said area above said vegetation canopy for communication with said modules under said vegetation canopy;
 said broadcast communication being according to broadcast time slots assigned to each of said modules;
 each of said repeaters being powered by a solar panel mounted with said repeater;
 said repeaters acting as routers within a mesh network for conveying data and commands to and from said modules and at least one gateway;
 said gateway being mounted above said vegetation canopy and being powered by a solar panel mounted with said gateway;
 said gateway maintaining at least periodic communication with a remote management server via a cellular telephone network.

2. The network of claim 1 wherein said sensor modules include insect detection modules, said actuator modules include pheromone dispersal modules and said management server is an insect management server.

3. The network of claim 2 wherein said insect detection modules comprises a camera and a grid imaged by said camera according to a schedule.

4. The network of claim 2 wherein said sensor modules further include pheromone tracker modules for determining the presence of a pheromone.

5. The network of claim 1 wherein said modules are solar-powered.

6. The network of any of claim 1, 2, 3, 4 or 5 wherein said area is an agricultural production area and said management server is an agricultural management server.

* * * * *